Sept. 15, 1925.
D. R. RICHIE
PARCEL CARRIER
Filed March 27, 1924  2 Sheets-Sheet 2
1,554,034
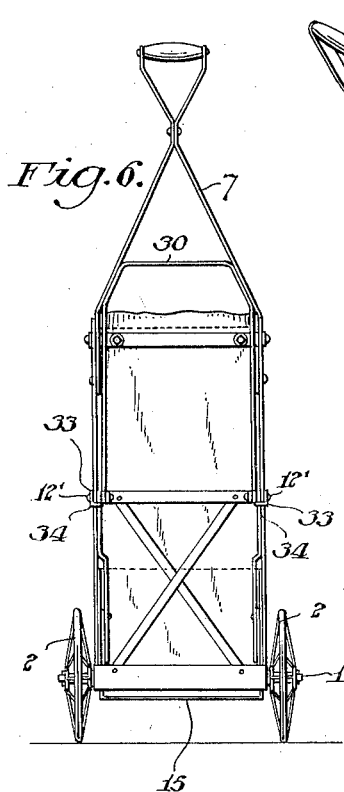
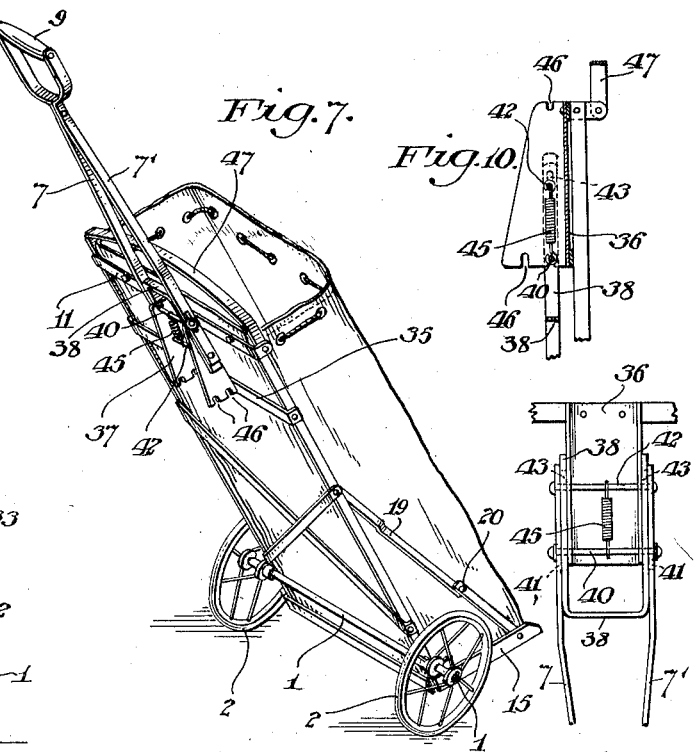
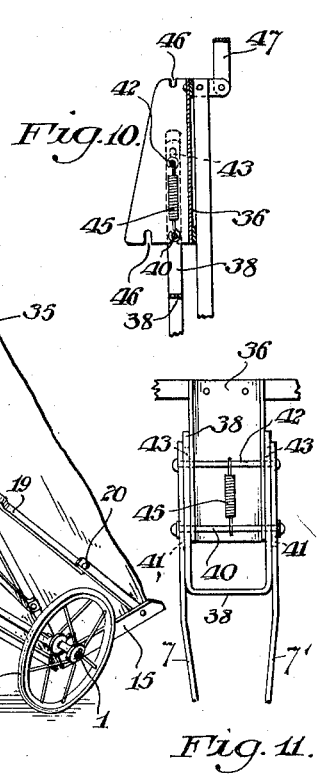
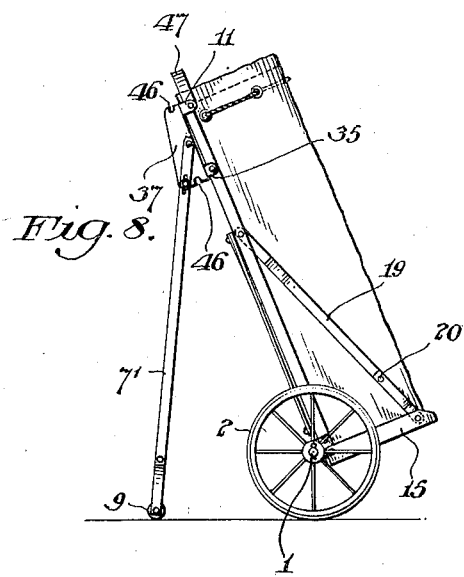
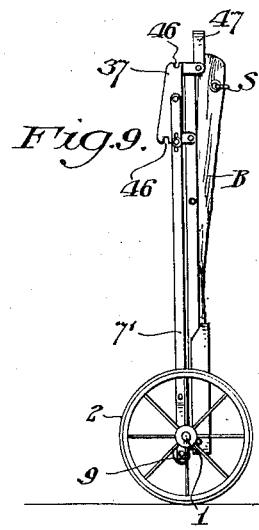
Inventor:
David R. Richie,
By Blount & Helbert
Attorneys.

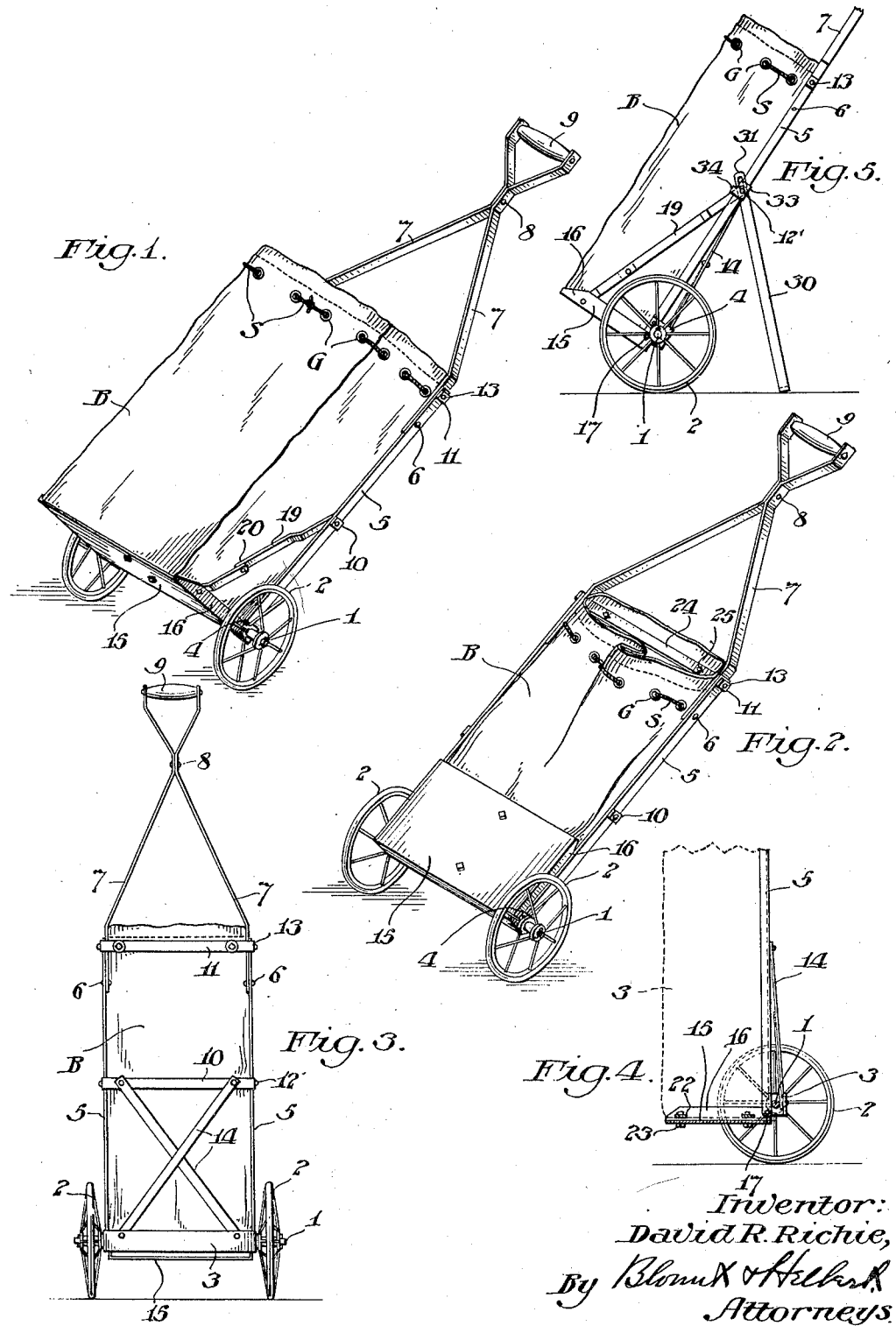

Patented Sept. 15, 1925.

1,554,034

UNITED STATES PATENT OFFICE.

DAVID R. RICHIE, OF LANSDOWNE, PENNSYLVANIA.

PARCEL CARRIER.

Application filed March 27, 1924. Serial No. 702,179.

*To all whom it may concern:*

Be it known that I, DAVID R. RICHIE, a citizen of the United States, and a resident of Lansdowne, county of Delaware, and State of Pennsylvania, have invented certain new and useful Improvements in Parcel Carriers, of which the following is a specification, reference being had to the accompanying drawings.

My invention is directed toward providing a parcel carrier which may be readily transported when empty and which when filled with parcels may be wheeled about, thus transferring to the ground and relieving the operator from the necessity of supporting the weight of the contained parcels as is unavoidable with the ordinary market basket when carried on the arm.

Further objects of my invention are to provide a device of the character described which embodies a collapsible fabric container for holding the parcels in association with foldable means adapted when in one position to extend the bottom of the container and afford adequate support to the parcels therein disposed, thus relieving the container from the strain which would otherwise be imposed thereon in the absence of such support. Still further objects of the invention are to provide a parcel carrier which may be readily and inexpensively constructed and sold at a low price; which embodies but a relatively small number of parts and those of such design and construction as to avoid likelihood of their becoming damaged or otherwise rendered unserviceable under the conditions of use to which articles of this character are ordinarily subjected; which is light and easily transported and which, to facilitate transportation, may be readily folded to compact form so that it may be readily lifted into or out of trolley cars or the like, and which, in certain embodiments, may be provided with means for maintaining the carrier in a convenient position for the introduction of parcels thereto.

My invention further includes other objects and novel features of design, construction and arrangement hereinafter more specifically referred to or which will be apparent from the following description of certain embodiments of the invention in connection with the accompanying drawings in which I have illustrated the same.

In the said drawings Fig. 1 is a perspective view of one form of the invention with the container support unfolded and the container extended, thus placing the device in a position for the reception of parcels, and Fig. 2 is a similar view with the support folded up so as to place the device in condition for convenient transportation. Fig. 3 is a bottom plan view of the form of the invention shown in the preceding figures, and Fig. 4 is a fragmentary central section thereof with the container support unfolded and illustrating certain details of construction. Fig. 5 is a fragmentary side elevation of a slightly modified form of the invention embodying means for supporting the carrier in convenient position for the reception of parcels, said means being shown in unfolded or supporting position, and Fig. 6 is a bottom plan view thereof with the supporting means disposed in folded or nonsupporting position. In Figs. 7 to 11 inclusive I have shown a still further modified form of the invention, Fig. 7 being a perspective view thereof with the container support unfolded, the container in extended position and the handle, which in this form of the invention is made adjustable, disposed in the position which it occupies when the carrier is being wheeled over the ground; Fig. 8 is a side elevation showing the handle disposed to afford support to the carrier when parcels are being placed therein, and Fig. 9 is a similar view showing the handle disposed in folded down position and the container support also folded, thus placing the carrier in condition for convenient transportation, while Fig. 10 is a fragmentary enlarged detail section and Fig. 11 a similarly enlarged fragmentary rear elevation illustrating one form of mechanism by which the different positions of adjustment of the handle may be effected and maintained. The same numerals are used to designate corresponding parts throughout the drawing.

Referring now more particularly to the form of the invention illustrated in Figs. 1 to 4 inclusive, the same comprises an axle 1 at the ends of which are rotatably supported a pair of wheels 2 conveniently provided with rubber tires. Disposed to extend parallel to and at a slight distance from the axle is a narrow plate 3 preferably formed from a flat strip of steel or other suitable metal and provided at its ends with turned up ears 4 pierced for the passage of the axle and lying adjacent the inner ends of the wheel hubs, the arrangement being such that the plate is freely rotatable about the axle. Fixedly secured to these ears and extending outwardly from the axle in laterally spaced relation and at right angles thereto are side frame members 5, 5 to which, adjacent their free extremities, which for convenience I may term their "upper ends," are rigidly secured, as by rivets 6, the handle bars 7, 7 which, above the termination of the side frame members, may be gradually converged till they contact each other and secured together with a rivet 8. From this point the bars may be suitably diverged and arranged to receive a transversely disposed hand grip 9 of wood or other suitable material. About midway between the ends of the side members I may provide a transverse brace 10 and a substantially similar brace 11 adjacent the upper ends of the members, the former being held in position by rivets 12 and the latter by rivets 13 which also assist in holding the handle bars rigidly to the side members. I may also dispose a pair of diagonal braces 14 between the transverse brace 10 and the plate 3, securing them in place by rivets or other suitable means, and it will thus be apparent that I have provided a light but rigid open frame comprising the side members, handle bars, braces and plate 3 which, through the medium of the latter, is supported from yet freely rotatable about the axle 1, and that irrespective of the position to which the frame may be rotated about the axle the whole device may be readily pushed about over the ground when supported on the wheels.

For supporting the bottom of the container or bag B, hereinafter more fully described, I provide a support 15 preferably consisting of a flat rectangular metal plate having its lateral edges 16 turned up at right angles to its general plane, and to enable the support to be folded substantially parallel to the side members of the frame or unfolded substantially at right angles thereto I pivot the inner portions of the turned up edges 16 to the lower ends of the side members 5, 5 by means of pivots 17. It will be understood that the overall width of the support is slightly less than the distance between the side members so it will fold between the latter, and while the pivots 17 may be arranged in any convenient manner I prefer to employ for that purpose the lowermost of the rivets by which the plate 3 is united to the members by making them sufficiently long to extend through the ears 4, the ends of the members and the turned up portions of the support. For holding the support in unfolded position substantially at right angles to the plane of the side members I provide a pair of folding struts 19 each comprising a pair of links pivoted together at 20 and also pivoted to the turned up edges of the support and the adjacent side frame member, and if necessary I may offset one of the strut members slightly as clearly shown in Fig. 1 so that when the support is folded back the turned up edges thereof, as well as the members of the strut, will lie snugly adjacent each other and also adjacent the side frame member as shown in Fig. 2, thus reducing the thickness of so much of the carrier as lies above the axle to but little more than the depth of the side members.

The container or bag B for holding the parcels may be formed of drilling, canvas or other suitable material and is preferably provided with a substantially rectangular bottom of about the dimensions of the support 15. It may also be provided with gromets G adjacent its mouth through which a draw string S may be inserted. The bag is operatively permanently attached to the support in any suitable way, conveniently by providing metal spreaders 22 in length about equal to the width of the support and disposing them against the inner surface of the bottom of the bag adjacent the front and rear edges of the support, in which position they are secured in place by small bolts 23 extended through the support, the bag and the spreaders and provided with retaining nuts. The upper end of the bag may also be secured to the frame in a somewhat similar manner as by a spreader 24 disposed inside of the bag adjacent the upper brace 11 and secured thereto by bolts and nuts 25, thus keeping the rear portion of the upper part of the bag extended across the frame.

It will thus be apparent that the bag support 15 when opened out or unfolded furnishes a rigid and adequate support for the bag and relieves the latter from the strain to which it would otherwise be subjected when filled or partially filled with parcels, while, when it is desired to move the empty parcel carrier from place to place, as when going to market, the support may be readily folded up in the manner shown in Fig. 2, under which conditions the carrier is reduced to a compact and readily transportable form.

In the form of the invention shown in Figs. 5 and 6 means are provided for holding the carrier in a convenient position for loading, said means being also utilized under other conditions to provide a convenient hand hold or grip for lifting and transporting the carrier. More particularly the said means may comprise a substantially U-shaped element 30 formed of a strip of steel or other suitable material and provided with closed slots 31 at its free ends. This element or leg is of slightly less width than the distance between the side frame members 5, 5 and at its closed end is shaped so as to nest between the handle bars 7, 7 as best shown in Fig. 6. The leg is pivotally attached to the side members of the frame by the rivets 12' which extend through the slots 31 in the ends of the leg in such manner that the latter may be swung down when desired to substantially the position shown in Fig. 5 to thereby support the frame in a more or less vertical position or swung up to substantially parallel relation with the side members so as to engage and be frictionally retained between them as in Fig. 6, in which position the transversely extending part of the leg furnishes a convenient hand hold for lifting and transporting the carrier. In order to prevent the leg from moving upwardly and rearwardly when disposed in supporting position, I may mount on each of the rivets 12' a small plate 33 having an overhanging lug 34 extending inwardly into the path of movement of the adjacent end of the leg so that when the latter is turned to supporting position, thereby bringing the pivots 12' to the lower ends of the slots 31, the ends of the leg will project sufficiently to engage the lugs thereby blocking the leg from movement in the said directions (see Fig. 5), while when it is desired to fold the leg up into carrying position it is only necessary to first move it longitudinally sufficiently to bring the pivots to the opposite ends of the slots and thereby clear the ends of the leg from the lugs.

In Figs. 7 to 11 inclusive I have illustrated another slightly modified form of the invention in which I have provided, among other things, a handle adjustable to three positions, to wit, one suitable for propelling or drawing the carrier over the ground, another in which the handle forms a support or leg for maintaining the carrier in loading position and still another in which the handle is folded in substantial parallelism with the side frame members, thus materially shortening the overall length of the carrier to facilitate transportation. With these objects in view I may provide an additional transverse brace 35 a short distance below the upper brace 11 and rivet or otherwise secure to these braces a plate 36 having its edges turned up to provide a pair of spaced webs 37 which are correspondingly notched at their opposite ends. The hand grip 9 is supported between the upper ends of two slightly divergent handle bars 7, 7' which, at their lower extremities, extend on each side of the webs 37 and enclose a U-shaped latch 38, and a pin 40 is extended transversely through holes drilled in the latch and slots 41 cut in the ends of the handle bars while another pin 42 is extended through holes drilled in the extreme ends of the bars and in the webs and through slots 43 cut in the ends of the latch, the two pins being connected by a coil spring 45. The pin 40 is normally adapted to engage in aligned pairs of notches 46 in the ends of the web, but when the latch is lifted toward the grip 9 and against the tension of the spring this pin may be cleared from the notches so as to permit the handle bars to be turned about pin 42 to any desired position. But one set of notches is provided in the upper ends of the webs and two sets in the lower ends so that when the bars are turned upwardly as shown in Fig. 7 and the latch released, the pin 40 will engage the notches in the upper ends of the webs so as to lock the handle bars substantially parallel to the side frame members 5, while when the handle bars are swung down they may be locked by engagement of the pin in one set of notches on the lower ends of the webs in angular disposition with the side frame members so as to form a leg to support the carrier as shown in Fig. 8 or may be locked by engagement of the pin in the other set of notches in substantially parallel relation with the side frame members as shown in Fig. 9. In order to provide a convenient handle or grip for lifting and transporting the carrier when the main handle is folded down as in the said figure, I may extend a strap or band 47 between the upper ends of the side frame members by either forming the same integral with the members or securing it thereto in any convenient way. The arrangement of the bag support, as well as the bag itself, may in the forms of the invention last described be substantially similar to that of the form illustrated in Figs 1 to 4 inclusive.

It will thus be apparent that I have provided a parcel carrier which may be conveniently employed for the transportation of parcels and the like and in which the weight thereof is firmly and rigidly supported by means other than the container of cloth or other material employed for holding the parcels and that by folding up the container support the carrier may be readily placed in condition for convenient transportation. It will be understood, however, that while for the purpose of enabling those skilled in the art to understand and practice the invention I have herein described certain embodiments thereof with considerable particularity, I do not thereby desire or intend to in any manner limit myself specifically thereto as the design, construction and arrangement of the various parts may be modified and varied if deemed desirable without departing from the spirit and scope of the invention as defined in the appended claims.

Having thus described my invention, I claim and desire to protect by Letters Patent of the United States:

1. A parcel carrier comprising an axle, supporting wheels, a frame supported from the axle, a collapsible parcel container disposed adjacent the frame and means movable with respect to the frame from a position substantially aligned therewith to a position substantially normal thereto, said means when in said last mentioned position being adapted to form a rigid support for the bottom of the container substantially coextensive therewith whereby the container is substantially relieved from the weight of parcels or the like when therein disposed.

2. A parcel carrier comprising an axle, supporting wheels, a frame supported from the axle, a fabric parcel container disposed adjacent the frame, a container support comprising a plate substantially coextensive with the bottom of the container and movable with respect to the frame from a position substantially aligned therewith to a position substantially normal thereto to provide a support for the bottom of the container operative to substantially relieve the container from the weight of articles disposed in the container when resting on the bottom thereof.

3. A parcel carrier comprising an axle and supporting wheels carried thereby, a frame supported by and extending away from the axle, a fabric bag closed at the bottom and open at the top, a foldable bag support substantially coextensive with the bottom of the bag pivoted adjacent the axle and movable from a position substantially parallel to the frame to a position substantially at right angles thereto, means for maintaining said support in said last-mentioned position, and means for attaching the bottom of the bag to the support comprising a metal strip disposed on the upper surface of the bottom of the bag and secured therethrough to the support.

4. A parcel carrier comprising an axle, supporting wheels carried thereby, a frame, a handle supported by the frame, a collapsible parcel container open at the top and closed at the bottom, a container support comprising a plate substantially coextensive with the bottom of the container and movable from a position substantially parallel to the frame to a position substantially normal thereto, means for holding said support in the last mentioned position, and means attaching the bottom of the container to the said support and the upper part of the container to the frame whereby when said support is in said last mentioned position the bottom of the container is extended substantially normal to the frame.

In witness whereof, I have hereunto set my hand this 25th day of March, 1924.

DAVID R. RICHIE.